Sept. 29, 1964

G. T. RONK ETAL 3,150,863

FEED PROCESSING DEVICE

Filed April 21, 1960

George T. Ronk
Harvey C. White
INVENTORS

BY
Ooms, McDougall, Williams & Hersh
Attorneys

George T. Ronk
Harvey C. White
INVENTORS

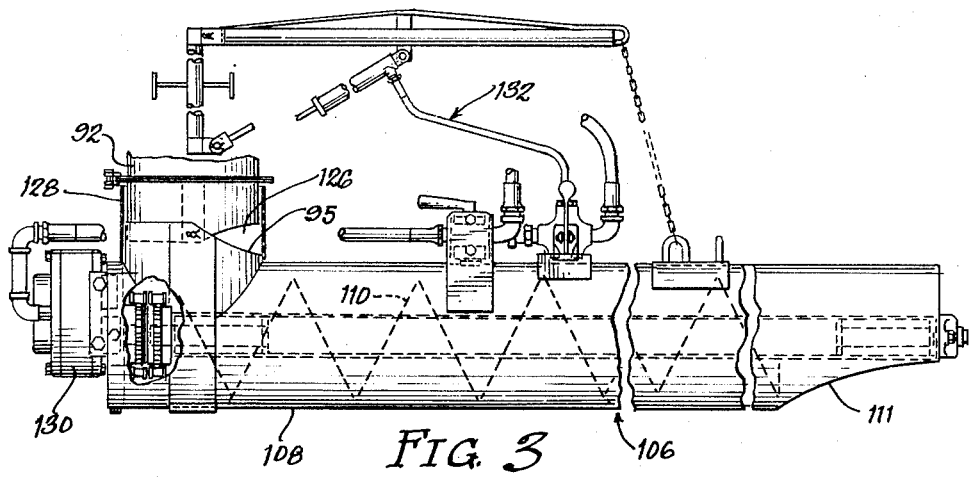
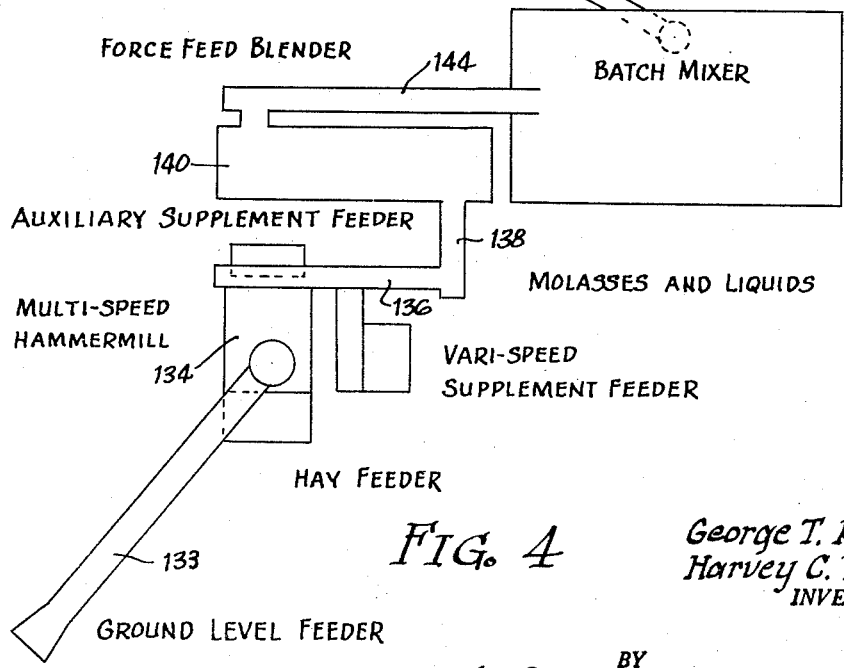

Sept. 29, 1964  G. T. RONK ETAL  3,150,863
FEED PROCESSING DEVICE
Filed April 21, 1960  4 Sheets-Sheet 4

George T. Ronk
Harvey C. White
INVENTORS

BY
Ooms, McDougall, Williams & Hersh
Attorneys

United States Patent Office 3,150,863
Patented Sept. 29, 1964

3,150,863
FEED PROCESSING DEVICE
George T. Ronk and Harvey C. White, Cedar Rapids, Iowa, assignors to Barnard & Leas Manufacturing Company, Inc., Cedar Rapids, Iowa
Filed Apr. 21, 1960, Ser. No. 23,684
4 Claims. (Cl. 259—45)

This invention relates to an apparatus for processing dry pulverulent material by grinding, mixing and blending and more particularly to the combination of such processing means with means for delivery of the processed pulverulent material to a common outlet for continuous displacement interchangeably either by pneumatic means or by mechanical means from the processing machine.

This invention will be described with particular attention to a mobile unit for processing feed as by grinding, pre-blending, batch mixing and the like. It will be understood, however, that the concepts of this invention will have application to delivery of dry pulverulent material from other types of processing equipment from which such material must be continuously displaced as it is prepared.

To the present, such processing equipment has made use of separate discharge mechanisms for pneumatic delivery by air or for mechanical delivery by auger requiring the movement of the mobile equipment for change from one method of delivery to the other and also requiring manipulation of equipment and adjustments thereof for the inactivation of one method for delivery prior to activation of the other.

It is an object of this invention to produce processing equipment of the type described in which the pulverulent material can be delivered to but a single outlet and wherein use is made of a means operative to effect displacement of the pulverulent material from said outlet continuously in response to the delivery of material thereto either by air or by mechanical means and it is a related object to provide a simple and efficient means for conversion from one means of delivery to the other without the necessity for making extensive adjustments of the equipment or for making material change in the position or elements thereof.

More specifically, it is an object of this invention to produce a mobile unit for processing dry pulverulent material with delivery to a single outlet embodying a means in combination therewith for delivery interchangeably by air or by auger with only a minor adjustment of elements.

These and other objects and advantages of this invention will hereinafter appear and for purposes of illustration, but not of limitation, an embodiment of the invention is shown in the accompanying drawings, in which—

FIG. 3 is an elevational view with parts broken away of the screw conveyor means;

FIG. 4 is a diagrammatic flow sheet of a process for use of the equipment in the preparation of feed.

Figure 1:
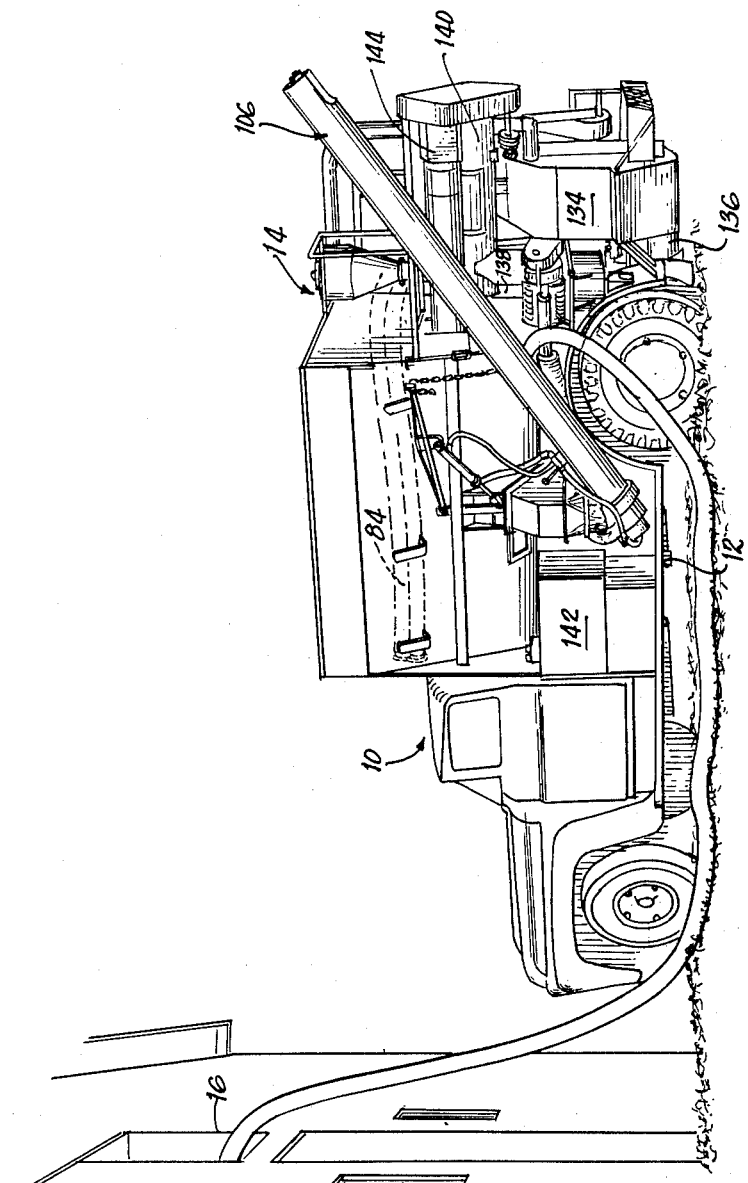
FIG. 1 is a perspective elevational view of a mobile unit embodying the features of this invention.

In the drawings, illustration is made of a truck 10 having a truck body 12 on which there is mounted processing equipment 14 for grinding, mixing and blending feed for delivery either into a bin 16 for storage or onto a conveyance means for delivery to other locations for distribution and use. Mounting of the processing equipment on such mobile unit enables transportation of the process equipment from place to place for use by individual farmers or farm groups. This avoids the expenditure of time and effort for transportation of the bulkier feed components to a common location for processing and the return of the processed feed to the original location for use. The mobility of the processing equipment also enables maximum utilization to be made of the equipment thereby to enable faster write-off of the capital investment.

This is of considerable importance where separate groups have different feed requirements or different materials available for use in the preparation of feed. It is of importance also where the processing is to take place in different locations where certain materials can be made available at lower cost than at others and where transportation from one location to another is either expensive or difficult.

The exact components which make up the processing equipment mounted on the mobile unit may vary. However, the concepts of this invention are addressed to the means for delivery of the processed pulverulent material from the machine as it is made available by the last piece of processing equipment, usually in the form of a mixer 20 adapted for side delivery to a single outlet. Preceding the mixer, the processing equipment may include weighing scales for proportioning the materials in the ratios desired in the final product; hammermills or other grinding equipment for reducing one or more of the components to a more finely divided state; blenders for combining the materials, and the mixer for uniform distribution of the materials one within another in the preparation of the feed. It will be understood that the processing equipment may include means to incorporate solutions of other liquids into the dry material, such for example as molasses, whereby introduction can be made and blended into the material or components thereof without balling. When such liquids are introduced into the mixture of materials for blending, the amount of liquid should be controlled so as not to interfere with the production of a relatively dry pulverulent material as a final product.

Figure 2:
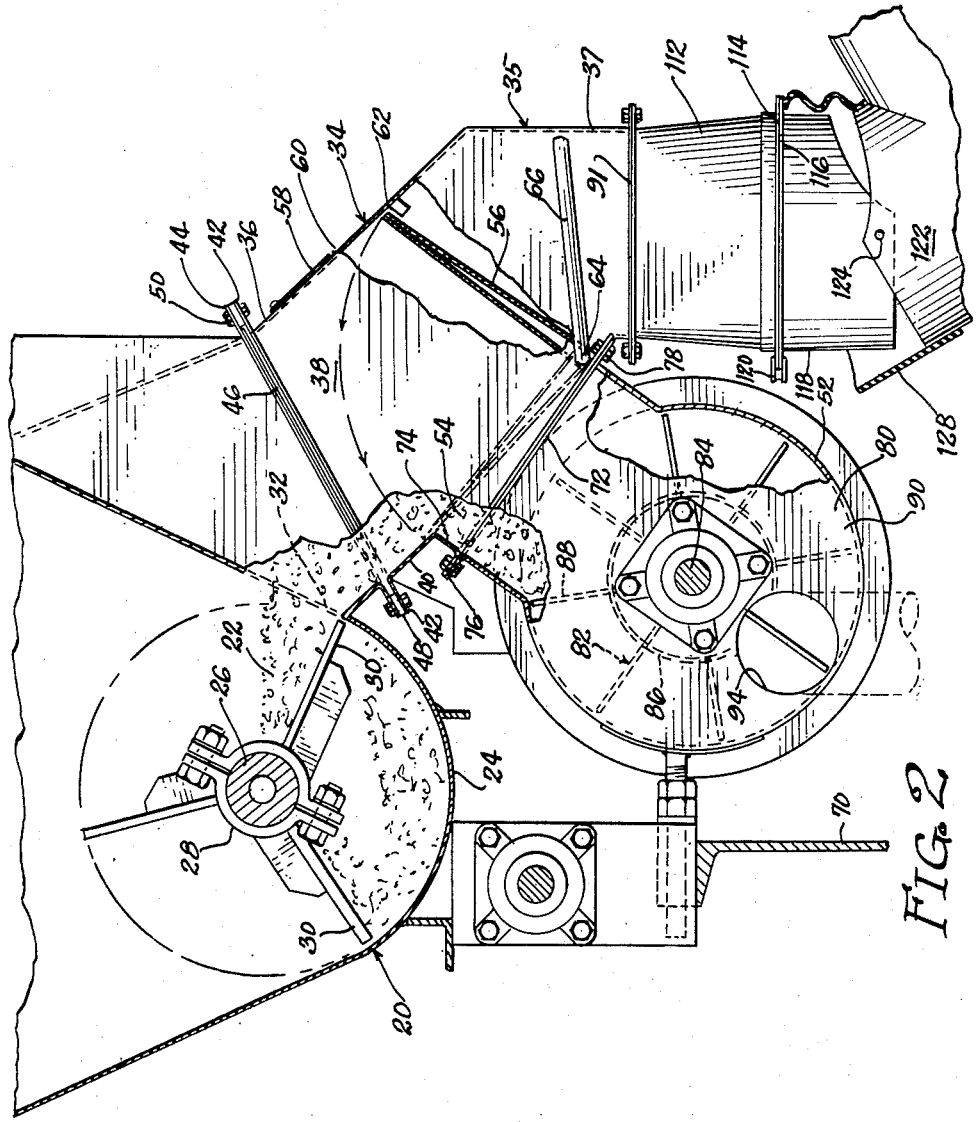
FIG. 2 is an enlarged sectional elevational view through the portion of the processing equipment embodying the features of this invention.

Referring now more specificaly to FIG. 2 of the drawings, the final step in the processing of the feed material 22 comprises the mixer 20 in the form of the trough 24 extending lengthwise of the vehicle. The trough is formed with a rounded bottom and it is provided with a horizontally disposed shaft 26 journalled at its ends in suitable bearings 28 for rotational movement in one direction. A plurality of paddles 30 extend radially outwardly from longitudinally spaced apart portions of the shaft for agitation of the material in the mixer to effect uniform distribution of the materials introduced therein. The paddles are arranged to effect displacement of material in the trough in a direction inwardly towards the center to a delivery opening 32 whereby the blended dry pulverulent material is delivered to the opening for displacement from the machine. In alignment with the delivery opening, the paddles are arranged to project the dry pulverulent material through the opening when open. Instead of paddle blades 30, preferably tipped in one direction for lengthwise displacement of the blended material, the mixer may be replaced by a blender provided with ribbons, as in a continuous ribbon type blender, well known in the processing art, to blend the materials while effecting displacement to a delivery opening at one end.

Figure 5:
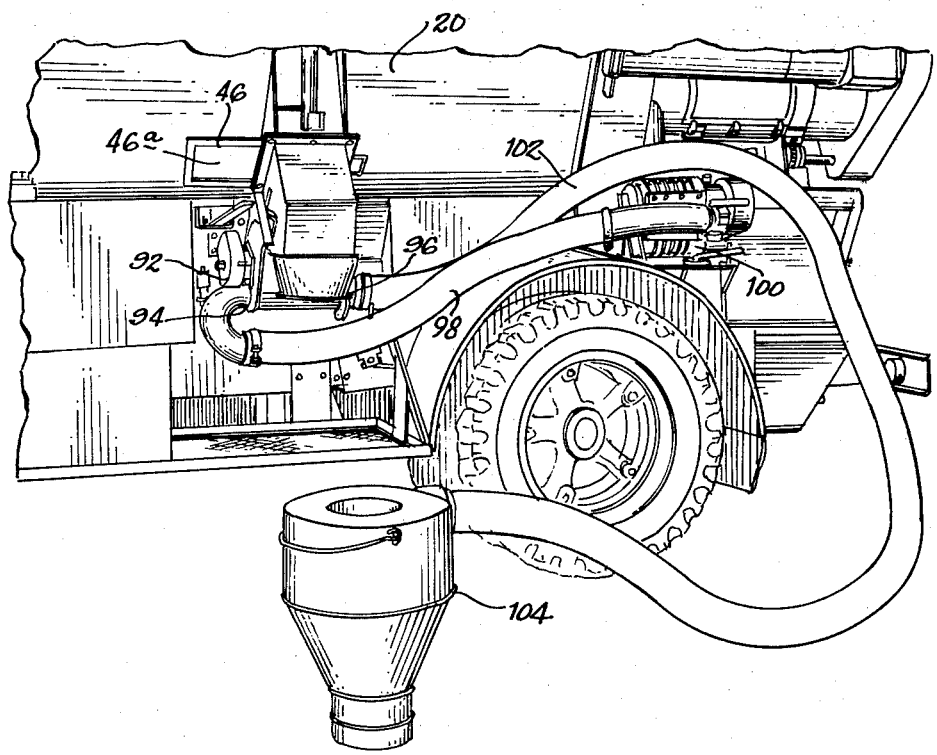
FIG. 5 is a side elevational view of the device with the auger omitted.

In communication with the outlet opening 32 there is provided an adaptor housing in the form of a downwardly inclined tubular member 34 of rectangular shape having a top wall 36, side walls 38 and bottom wall 40. The tubular member is formed with an end section 35 extending downwardly therefrom with vertically disposed side walls 37. The rectangularly shaped tubular section is formed with outwardly extending flanges 42 at the upper end for attachment to similar flanges 44 extending outwardly from the walls defining the outlet opening from the blender. The flanges are secured with a spaced relationship therebetween for enabling displacement of a flat plate 46 for use as a gate to block the opening between the blender and the adaptor, when in one position (see FIG. 5), and thereby to prevent passage of material therethrough when the plate 46 is displaced to blocking position and to permit communication between the outlet opening of the blender and the adaptor when the plate is displaced to open position. For this purpose the slide plate 46 is formed with an opening 46ª in one half dimensioned to correspond with the opening 32, while the other half is solid to block the opening when in closed position. The spaced relationship between the adaptor flanges and the blender flanges can be achieved by the use of spacers 48, secured in place by bolt and nut means 50 by which the adaptor is fastened to the blender or by other suitable spacer means. It will be understood that the plate 46 may be adjusted to any desirable position between open and closed positions for regulating the dimension of the openings between the blender and the adaptor to regulate the flow of material therebetween and to block the inflow of air from the air lock 52 to the blender when using an air stream for pneumatic delivery of the blended pulverulent material.

The tubular section 34 of the adaptor is provided with an opening 54 in the bottom wall dimensioned to have a length which is less than the distance between the bottom and the top wall. Pivotally mounted within the tubular member adjacent the lower edge of the opening is a door plate 56 dimensioned to span the opening between the top and bottom wall both in the crosswise and in the lengthwise dimension whereby it will be effective to block the passage lengthwise through the adaptor when the door is rocked to raised position and whereby the outer end of the door will extend beyond the upper edge of the opening to block the opening 54 when rocked to lowered position to bring the outer edge of the door in position of rest on the portion of the bottom wall of the adaptor beyond the opening.

The top wall 36 is provided with an opening 58 adapted to be concealed by a removable cover plate 60 for gaining access to the interior thereof. On its inner surface in substantial vertical alignment with the door pivot, the top wall is provided with a cross bar 62 in position to be engaged by the outer edge of the door when rocked to raised position thereby to function as a stop for the door and as a means to effect a sealing relationship therebetween more effectively to block communication with the open end of the adaptor. The door is pivotally mounted at its lower end for rocking movement between raised and lowered positions and it is provided with a rod 64 extending laterally through the side wall of the adaptor for engagement by a handle 66 whereby the door can be rocked manually between its various positions of adjustment.

Fixed to the blender frame 70 is an air lock chamber 52 having an inlet opening 72 in the upper side wall in communication with the opening 54 in the bottom wall of the adaptor for the passage of pulverulent material gravitationally through the adaptor and through the aligned openings when the door 56 is in raised position. For this purpose, the portion of the bottom wall 40 about the opening is turned downwardly, as at 74, and the edge portions are bent outwardly to provide flanges 76 for abutment against similar flanges formed in the air lock about the inlet opening for effecting joinder in sealing relationship as by means of bolt and nut members 78 or other equipment metal joining or securing means.

The air lock comprises a cylindrical housing 80 having a squirrel cage 82 mounted for rotational movement therein. The squirrel cage, rigid with an axial shaft 84 for rotational movement therewith, includes a central cylindrical section 86 having a plurality of sectioning vanes 88 extending radially outwardly in circumferentially spaced apart relation to the inner wall of the housing to define separated pockets 90 therebetween. The shaft and squirrel cage are adapted to be rotated in one direction within the housing by means of a power source 92 taken off of the power equipment of the vehicle or a separate motor.

The cylindrical housing is formed with an inlet opening 72 in the cylindrical side wall and with a pair of openings 94 and 96 in the end walls aligned crosswise with each other and with a pocket between the sectioning vanes 88 of the squirrel cage 82. The opening 94 in one end is connected by a flexible tubing 98 to an air pump 100 for the continuous introduction of low pressure air in relatively small volume through the opening 94 into the housing. The outlet opening 96 communicates with a length of flexible tubing 102 through which the dry pulverulent material displaced by the air passing through the housing is carried to a distant station. The end of the tubing 102 is usually provided with a separating means 104 whereby the air is released while causing the solids to be deposited from the air stream.

Secured to the adaptor 34 in communication with the open end 91 is an auger 106 in the form of a screw conveyor of conventional construction having an elongate cylindrical housing 108 in which a screw 110 rotates for displacement of the material lengthwise from the inlet end 95 to the outlet opening 111 in the bottom side of the housing and at the outer end thereof.

For flexibility in operation, a tubular member 112 is secured to the end of the adaptor 34 in alignment with the open end 91. The tubular member is formed with an annular flange 114 at its lower end for receiving a flange 116 of the tubular section 118 of the screw conveyor in abutting relationship therewith. The two flanges are secured by means of a ring clamp 120 to hold the sections together while permitting free rotational movement therebetween thereby to enable the screw conveyor to be turned relative to the machine about the central axis of the tubular member as a pivot.

To enable the screw conveyor to be rocked in a vertical direction relative to the machine, the screw conveyor is provided with a tubular section 122 in communication with the inlet opening which tubular section is dimensioned to receive the section 118 in telescoping relation with the sections being pivoted one on the other about aligned interconnecting pins 124 as a pivot. Portions corresponding to about a semi-circular section are cut away from each tubular section adjacent the pivot, as at 126, to enable the sections to be rocked relative to each other about the pivot. To conceal the openings which remain between the tubular sections, one section is provided with a flexible, cylindrical sealing apron 128 dimensioned to extend beyond the adjacent edge of the other section in any position of angular adjustment.

A separate power source 130 may be employed to turn the screw or power may be taken off of the equipment drive. Further, hydraulic lift means 132 may be employed to raise or lower the screw conveyor to the desired position of adjustment for use.

The invention will now be described with reference to the use of the equipment for the preparation of a feed composition embodying a combination of ingredients including molasses—50 pounds, feed concentrate—600 pounds, oats—100 pounds, and corn—1250 pounds.

The corn is supplied to the feeder 133, such as in the form of a screw conveyor, by which it is advanced to a hammermill 134. The ground corn is advanced from the hammermill laterally by an auger 136 to an elevator 138 wherein it is raised to the feed end of a horizontally disposed blender 140. The molasses in reservoir 142 is metered into the blender 140 for admixture with the corn before all of the corn has been processed therethrough. The ground corn and molasses is blended and then advanced continuously from the outlet end of the blender through a screw conveyor 144 to the inlet of the vat mixer 20. The oats and concentrate can be charged directly to the mixer or they can be introduced with the ground corn into the blender for conveyance therewith into the mixer.

In the mixer, the ingredients are agitated by the paddles at the bottom and by other paddles near the top uniformly to blend the ingredients. After mixing has been completed, the slide gate 46 is displaced to align the opening 46ª with the outlet so that the pulverulent material will be forced by the paddles 30 to the adaptor for transfer either to the air lock cylinder for pneumatic conveyance or to the opening 90 for displacement by the screw conveyor.

If the door 56 is raised, the pulverulent material forced from the mixer into the adaptor will force the door 56 into sealing engagement with the stop 62 and will cause the material to flow through the opening 54 into the pockets 90 of the rotating squirrel cage. As a pocket comes into axial alignment with the openings 94 and 96, the stream of air generated by the air pump 100 will engage the material in the pockets to cause displacement thereof through the outlet opening 96 into the tubing 102. The sectioning vanes 88 will seal off the other pockets from the air stream to prevent air from being blown into the adaptor 34 to interfere with uniform flow of material therethrough. Because of the sectioning effect of the vanes, the displacement of air will be of a pulsating nature whereby the material will react to a force other than mere entrainment for displacement from the cylinder and through the tubing. Thus conveyance is achieved with a minimum volume of air to permit easy separation of the material at the point of deposit at the outlet of the tubing.

When, on the other hand, delivery is desired to be made mechanically, the air pump is inactivated and the screw 110 is activated by connection to the power source of the device. The conveyor cylinder is rotated to the desired position and raised to the desired angle by the hydraulic lift. The door 56 is rocked from raised position to lowered position to seal off the air lock cylinder and communicate the inlet to the screw conveyor with the adaptor for forcing the material therethrough to the conveyor.

It will be apparent from the foregoing that we have provided a simple and inexpensive means for use in combination with processing equipment of the type described interchangeably to provide for delivery either by pneumatic or mechanical means from a single outlet and without the necessity for changing the position of the equipment or substantial arrangement of any of the elements operated in combination therewith.

It will be understood that the screw conveyor and the pneumatic conveyor may be interchanged with respect to the outlets from the adaptor but that it will be more efficient to arrange the pneumatic conveyor in the position described for better control of the air flow.

It will be understood that changes may be made in the details of construction, arrangement and operation without departing from the spirit of the invention, especially as defined in the following claims.

We claim:

1. In power operated equipment for processing pulverulent material having a tubular blender with an outlet opening in the side wall of the blender and wherein the material is finally mixed and continuously displaced toward the blender outlet opening, the improvement comprising a downwardly inclined laterally extending adaptor housing of rectangular shape formed of top, bottom, outer and inner end walls, and side walls, a first opening formed in the inner end wall of said adaptor, means joining the end wall of the adaptor to said blender whereby the first opening is in communication with said blender outlet opening for passage of the material from the blender into the adaptor housing, a shutter plate displaceable between blocking and unblocking position between said adaptor and blender openings to seal off the opening when in blocking position and to enable communication between the openings when in unblocking position, an outlet opening in the bottom wall of the adaptor through which the pulverulent material entering the adaptor gravitationally is adapted to flow, a pneumatic conveyor in direct communication with the bottom wall opening of the adaptor for pneumatic delivery of material passing through the bottom wall opening, a second opening in the outer end wall of said adaptor adjacent the outlet openings in the bottom wall of the adaptor, means connecting said second opening to a chute and a screw conveyor in communication with said chute for removal of material passing from said blender through said second opening, a shutter pivotally mounted in the adaptor housing adjacent the outer end portion of the bottom wall opening and adjacent the lower end of the outer end wall opening and dimensioned to cover said bottom wall opening when in lowered position and to block the passage through the adaptor housing when in raised position to seal off said end wall opening, and means external of the adaptor housing for displacement of the shutter between raised and lowered positions.

2. Equipment as claimed in claim 1 in which the opening in the bottom wall is dimensioned to have a length less than the height between the top and bottom walls of the adaptor housing and with the shutter pivoted at the outer edge of the bottom wall opening and dimensioned to have a length greater than said opening.

3. Equipment as claimed in claim 2 which includes a sealing abutment in the underside of the top wall of the adaptor housing and extending crosswise thereof in position to be engaged by the outer edge of the shutter when in raised position to seal off said second opening of the adaptor housing.

4. Equipment as claimed in claim 1 in which a spaced relationship exists between the adaptor housing and the blender to form a slot therebetween in which the shutter plate is slidable between blocking and unblocking position.

References Cited in the file of this patent

UNITED STATES PATENTS

| | | |
|---|---|---|
| 1,647,036 | Dileo | Oct. 25, 1927 |
| 1,710,585 | Matthiessen et al. | Apr. 23, 1929 |
| 2,101,490 | Bullock et al. | Dec. 7, 1937 |
| 2,146,776 | Strominger | Feb. 14, 1939 |
| 2,152,632 | Cassiere | Apr. 4, 1939 |
| 2,230,146 | Myers | Jan. 28, 1941 |
| 2,621,904 | Stauffer | Dec. 16, 1952 |
| 2,625,001 | Heun | Jan. 13, 1953 |
| 2,667,028 | Weishaar | Jan. 26, 1954 |
| 2,694,557 | Reese et al. | Nov. 16, 1954 |
| 2,735,661 | Patterson | Feb. 21, 1956 |
| 2,815,941 | Schmale | Dec. 10, 1957 |
| 2,894,733 | Wasmek | July 14, 1959 |

FOREIGN PATENTS

| | | |
|---|---|---|
| 400,769 | Great Britain | Nov. 2, 1933 |